(12) United States Patent
Gray et al.

(10) Patent No.: US 11,683,182 B2
(45) Date of Patent: Jun. 20, 2023

(54) MESSAGE EMBEDMENT IN RANDOM VALUES

(71) Applicant: International Business Machines Corporation, Armonk, NY (US)

(72) Inventors: Michael W. Gray, Guanaba (AU); Narayana Aditya Madineni, Southport (AU); Simon D. McMahon, GoldCoast (AU); Matthew Green, Ashmore (AU); Stephen J. McKenzie, Mudgeeraba (AU); Michael James Thomas, Bonogin (AU)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 16/869,783

(22) Filed: May 8, 2020

(65) Prior Publication Data
US 2021/0351932 A1    Nov. 11, 2021

(51) Int. Cl.
*H04L 9/08* (2006.01)
*H04L 9/32* (2006.01)

(52) U.S. Cl.
CPC ............ *H04L 9/3242* (2013.01); *H04L 9/088* (2013.01); *H04L 2209/08* (2013.01)

(58) Field of Classification Search
CPC ... H04L 9/0816; H04L 9/0819; H04L 9/0838; H04L 9/0861; H04L 9/0863; H04L 9/0869; H04L 9/088; H04L 9/3228; H04L 9/3236; H04L 9/3239; H04L 9/3242; H04L 63/0838
See application file for complete search history.

(56) References Cited

U.S. PATENT DOCUMENTS

| 9,984,176 | B2 | 5/2018 | Ueda | |
|---|---|---|---|---|
| 2011/0320803 | A1* | 12/2011 | Hampel | H04L 9/0863 713/150 |
| 2012/0275595 | A1* | 11/2012 | Emelko | H04L 9/08 380/44 |
| 2018/0212779 | A1* | 7/2018 | Bergmann | H04L 9/0662 |
| 2020/0127849 | A1* | 4/2020 | Lakk | H04L 9/3297 |

OTHER PUBLICATIONS

Lamport, Password authentication with insecure communication, ACM, 1981.*
Haller, The S/KEY one-time password system, 1994.*

(Continued)

*Primary Examiner* — Minh Dinh
(74) *Attorney, Agent, or Firm* — Scott S. Dobson

(57) ABSTRACT

A method, a computer program product, and a system for embedding a message in a random value. The method includes generating a random value and applying a hash function to the random value to produce a hash value. Starting with the hash value, the method further includes reapplying the hash function in an iterative or recursive manner, with a new hash value produced by the hash function acting as an initial value that is applied to the hash function for a next iteration, until a bit sequence representing a message is produced in a message hash value. The method further includes utilizing the message hash value as a new random value that can be used by an encryption algorithm.

20 Claims, 7 Drawing Sheets

(56) References Cited

OTHER PUBLICATIONS

Schneier, Applied Cryptography, 1996, John Wiley & Sons, Section 8.1.*
Sardi et al., "Embedding information in physically generated random bit sequences while maintaining certified randomness," EPL (Europhysics Letters) Journal, vol. 127, Sep. 2019, No. 6003, pp. 1-7.
Elmahi et al., "Text Steganography Using Compression and Random Number Generators," International Journal of Computer Applications Technology and Research, vol. 6, Issue 6, 2017, pp. 259-263.
Olivetti de Franca, F., "Iterative Universal Hash Function Generator for Minhashing," arXiv:1401.6124v1, Jan. 23, 2014, pp. 1-6.
"How to implement iterations when hashing passwords?", StackExchange, Printed: Feb. 19, 2020, 1 page. https://security.stackexchange.com/questions/123711/how-to-implement-iterations-when-hashing-passwords.
"Hashcash," Wikipedia, Printed: Feb. 19, 2020, 7 pages, https://en.wikipedia.org/wiki/Hashcash.
"Steganography," Wikipedia, Printed: Feb. 19, 2020, 11 pages, https://en.wikipedia.org/wiki/Steganography.
Mell et al., "The NIST Definition of Cloud Computing", Recommendations of the National Institute of Standards and Technology, Special Publication 800-145, Sep. 2011, 7 pages.

* cited by examiner

MESSAGE EMBEDMENT IN RANDOM VALUES

BACKGROUND

The present disclosure relates to message transmission, and more specifically, to embedding messages in a random value while retaining the characteristics of a random value.

Cryptosystems require randomness to be secure and therefore require a component, such as random value, from which to derive that randomness. Random number generators (RNGS) and pseudo-random number generators (PRNGS) are components that generate random values. RNGS and PRNGS can utilize sources of uncertainty, such as components running on an operating system. These components include, but are not limited to, key presses, mouse movement, running processes, and sensor data.

Plaintext messages, or signaling messages, refers to an unencrypted message that a sending party (e.g., a client, server) wishes to transmit to a receiving party (e.g., a server, client). These messages require encryption to prevent unwanted parties from intercepting the communication. For instance, man-in-the-middle attacks occur when an attacker, or unwanted party, relays and possibly alters the communications between two parties that believe they are directly communicating with each other.

SUMMARY

Embodiments of the present disclosure include a message embedding system for embedding a message in a random value, including a data processing component and at least one memory component. The system also includes local data storage having stored thereon computer-executable program code, which, when executed by the data processing component, causes the data processing component to generate a random value and applying a hash function to the random value to produce a hash value. Starting with the hash value, the program code further causes the data processing component to reapply the hash function in an iterative or recursive manner, with a new hash value produced by the hash function acting as an initial value that is applied to the hash function for a next iteration, until a bit sequence representing a message is produced in a message hash value. The program code further causes the data processing component to utilize the message hash value as a new random value that can be used by an encryption algorithm.

Additional embodiments of the present disclosure include a computer-implemented method for embedding a message in a random value. The computer-implemented method includes generating a random value and applying a hash function to the random value to produce a hash value. Starting with the hash value, the computer-implemented method further includes reapplying the hash function in an iterative or recursive manner, with a new hash value produced by the hash function acting as an initial value that is applied to the hash function for a next iteration, until a bit sequence representing a message is produced in a message hash value. The computer-implemented method further includes utilizing the message hash value as a new random value that can be used by an encryption algorithm.

Further embodiments of the present disclosure include a computer program product for embedding a message in a random value, which can include a computer-readable storage medium having program instructions embodied therewith, the program instructions executable by a processor to cause the processor to perform a method. The method includes generating a random value and applying a hash function to the random value to produce a hash value. Starting with the hash value, the method further includes reapplying the hash function in an iterative or recursive manner, with a new hash value produced by the hash function acting as an initial value that is applied to the hash function for a next iteration, until a bit sequence representing a message is produced in a message hash value. The method further includes utilizing the message hash value as a new random value that can be used by an encryption algorithm.

BRIEF DESCRIPTION OF THE DRAWINGS

These and other features, aspects, and advantages of the embodiments of the disclosure will become better understood with regard to the following description, appended claims, and accompanying drawings where:

Figure 1:
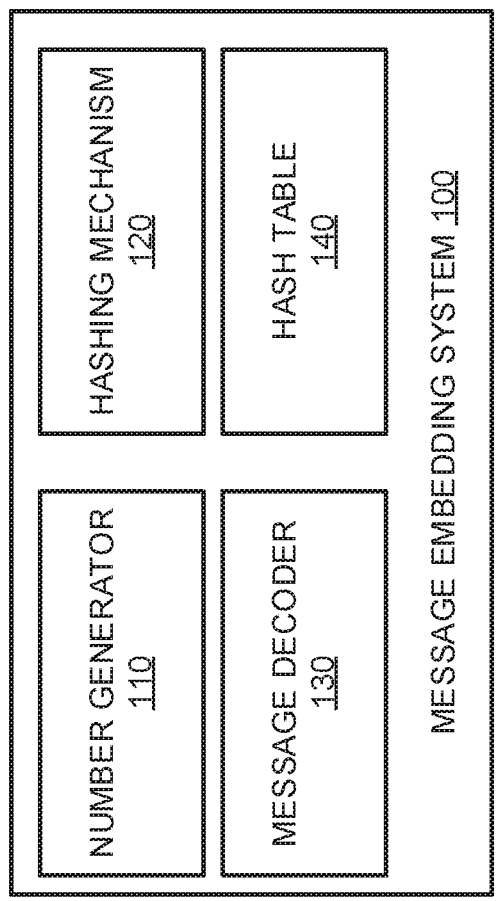
FIG. 1 is a block diagram illustrating a message embedding system, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to message transmission, and more specifically, to embedding messages in a random value while retaining the characteristics of a random value. While the present disclosure is not necessarily limited to such applications, various aspects of the disclosure may be appreciated through a discussion of various examples using this context.

RNGS and PRNGS produce random values with true random bits. An RNG can produce these bits from analog sources, in a nondeterministic way, without regarding entropy. PRNGS, however, can produce random bits from digital sources, in a deterministic way, but also with a high amount of entropy. Entropy can be viewed as the randomness collected by an operating system or application for use in cryptography. The higher the entropy, the less certainty there is in a result. Entropy is maximized when there is uniform distribution, such that no outcome is more likely than another outcome. As such, cryptosystems typically utilize PRNGS because they emphasize maximized entropy when generating random values.

PRNGS can also address other known security concerns such as backtracking resistance and prediction resistance. In backtracking resistance, also known as forward secrecy, previously generated bits are impossible to recover. In prediction resistance, also known as backward secrecy, future bits are impossible to predict. Thus, if an attacker compromises a cryptosystem, they cannot determine previous values or previously generated bits.

A PRNG configured to support cryptosystems is called a cryptographically secure PRNG (CSPRNG). In CSPRNGS, an attacker that does not know the seed used by the CSPRNG and has only a negligible advantage in determining the number produced by the CSPRNG as opposed to some other number. The types of CSPRNGS include, but are not limited to, stream ciphers, block ciphers running in an output feedback mode, CryptGenRandom, the Yarrow algorithm, and Fortuna.

A plaintext message or "message", as referred to herein, is an unencrypted message that can be encrypted with a cipher to render the message confidential. Once encrypted, the message is referred to herein as ciphertext. Encryption applies cryptographic techniques making messages incomprehensible to provide confidential communication between a sending party and a receiving party.

Limitations on random values remain, however, as random values cannot be used to securely transmit messages or signals without losing their randomness characteristic. Cryptosystems and protocols relying on the randomness of a number are weakened if the randomness is removed. If the randomness is removed, an attacker can exploit the cryptosystem and compromise potential communication between parties.

Embodiments of the present disclosure may overcome the above and other problems, by using a message embedding system. The message embedding system includes a number generator configured to generate a random value and a hashing function configured to calculate a hash value relating to random values generated by the number generator using a hash function. The hashing function is further configured to reapply a hash function in an iterative or recursive manner. With each iteration, the hash value produced in the previous iteration acts as an initial value that is applied to the hash function for a next iteration. The hashing iterations continue until a bit sequence representing a message is produced in a hash value. The hash value produced can be considered a message hash value as the hash value contains the message produced by the message embedding system.

More specifically, the message embedding system described herein embeds a predetermined message, or signaling message, into a random value without removing the randomness present in the random value. The random value can then be used by a cryptosystem. For example, the random value can be used by the Transport Layer Security (TLS) protocol when establishing a connection between a client and a server.

By way of example, but not by limitation, a client and a server initiate the process of establishing a TLS connection. TLS provides cryptographic protocols designed to provide communications security over a computer network. A server and a web client can establish a TLS connection by exchanging information in adherence with the TLS handshake protocol. The TLS handshake protocol defines the format of messages and the order of their exchange. Once exchanged, the result is a successful TLS connection, in which both the server and the web client can exchange application data securely using the TLS protocol. A successful TLS handshake between a web client and a server that establishes a TLS connection is commonly referred to as a TLS session. During the TLS handshake, the client includes a 32-byte random value and optional information such as various protocol parameters. The client can utilize the message embedding system to embed a message in the 32-byte random value prior to sending it to the server. The message can act as signaling information or as a pre-shared secret/password that can then be used for authentication. If the message is acting as a signal, for example, it can be used as a hidden parameter that is requesting support for Post Quantum cryptography. The server can decode the embedded message and respond based on the signal or authenticate the sender by verifying that the secret is correct.

In some embodiments, the message embedding system ensures that an inadvertent message is not sent to a receiving party. The number generator can generate a random value which the hashing function can apply a hash function to the number iteratively. After a predetermined iteration, the new hash value can be examined to determine whether a bit sequence representing an inadvertent message is located in the new hash value. If, upon determining that an inadvertent message is not within the hash value, the originally generated random value can be used as a random value in a cryptosystem.

In some embodiments, the message embedding system receives a transmitted random value that includes an embedded message. The message embedding system further includes a message decoder configured to verify that a received message is embedded in the transmitted random value. The hashing function can apply a hash function to the transmitted random value to produce a hash value. Utilizing the hash value, the message decoder can determine whether a message is present in the random value.

In some embodiments, a transmitted random value is hashed a predetermined amount of times. A sending party and a receiving party may have a shared predetermined number that is used in decoding embedded messages. The predetermined number can be a number of times the hashing function applies a hash function to a transmitted random value to reveal the embedded message. For example, a sending party can transmit a random value to a receiving party and both parties agree on a predetermined number. Upon receiving a transmitted random value, the receiving party can hash the random value the same amount of times as the predetermined number.

In some embodiments, an agreed upon predetermined number between a sending party and a receiving party is incremented after each use. A sending party and a receiving party can transmit embedded messages more than once. After each embedded message transmission, the predetermined number can be incremented. For example, the predetermined number may be twenty-five. After an embedded message is decoded, the twenty-five can be incremented by a predetermined number.

Referring now to FIG. 1, shown is a block diagram illustrating a message embedding system 100, in accordance with embodiments of the present disclosure. The message embedding system 100 includes a number generator 110, a hashing mechanism 120, a message decoder 130, and a hash table 140.

The number generator 110 is a component of the message embedding system 100 configured to generate a random value, in accordance with embodiments of the present disclosure. The number generator 110 can utilize various generators to produce a random value. These generators include, but are not limited to, RNGS, PRNGS, and CSPRNGS. For example, the number generator 110 that utilizes a PRNG can receive random bits from an RNG at regular intervals and uses those bits to update contents of a memory buffer, called an entropy pool. A PRNG utilizes the entropy pool as its source of entropy. When the entropy pool is updated, the bits in the pool are randomly mixed to remove possible statistical bias. The PRNG can then run a deterministic random bit generator (DRBG) algorithm that retrieves bits from the entropy pool into a longer sequence to generate a random value. Once the random value is generated, the PRNG can ensure that the DRBG does not receive the same input again.

In some embodiments, the number generator 110 utilizes CSPRNGS provided by an operating system. For example, generating random bits in a Unix-based system can be accomplished by reading device file /dev/urandom that generates 10 MB of random bits to a file. In Windows (a trademarked product of Microsoft for providing software, products, and services), the BcryptGenRandom( ) function can be called that produces entropy from the driver cng.sys.

In some embodiments, the number generator 110 utilizes hardware-based PRNGS to generate random values. For example, the Intel Digital Random Number Generator is a hardware-based PRNG that can be accessed through the RDRAND assembly instruction. The RDRAND inputs an argument of 16, 32, or 64 bits and produces a random value.

The hashing mechanism 120 is a component of the message embedding system 100 configured to apply hash functions to random values produced by the number generator 110, in accordance with embodiments of the present disclosure. The hash functions include, but are not limited to, MD5, SHA-1, SHA-256, SHA-3, and BLAKE2. These hash functions can include properties such as preimage resistance and collision resistance. Preimage resistance describes the security guarantee that given a random hash value, an attacker can never find a preimage of that hash value. As such, hash functions can be considered one-way functions because preimage resistance allows for the transition from a message to its hash, but not from the hash back to the message. As such, hash functions cannot be inverted.

Preimage resistance ensures that it is practically impossible to find any message that maps to a given hash value. Specifically, preimage resistance, or first-preimage resistance, describes cases where it is practically impossible to find a message that hashes to a given value. Whereas second-preimage resistance describes cases that when given a message, it is practically impossible to find another message that hashes to the same value as the first message.

Collision resistance refers to a property that prevents an attacker from being able to find two distinct messages that hash to the same value. Collision resistance can also be considered second-preimage resistance. The hashing mechanism 120 is further configured to eliminate birthday attacks. A birthday attack is defined by N message and as many hash values, where a total of N×(N−1)/2 potential collisions can be produced by considering each pair of two hash values. To prevent a birthday attack that determines a collision, the hashing mechanism 120 can utilize hash-based message authentication code (HMAC) as the hash function. By design, HMACs are less affected by collisions than other widely used hashing functions.

Additionally, the hash value produced by the hashing mechanism 120 retains the randomness of the initial random value. This is because hash functions provide unbiased uniform distributions. As such, given a random value, the randomness of the resulting hash value is not diminished resulting in an equivalent random value.

The hashing mechanism 120 is further configured to iteratively apply a hash function to a random value until a bit sequence representing a message is produced in a resulting hash value. The bit sequence is probabilistic and, on average, will be two to the power of the number of bits in the message. For example, a twelve-bit message will require 4,096 hash iterations on average. As such, the length of the message is preferably short, or approximately twelve to eighteen bits.

There is a possibility of a false message being detected in a random value. These instances have a probability of $1/2^m$ where m represents the number of bits in the message. A tradeoff of generation time based on the size of a message for greater false signal resistance on a per use case basis is also preferred. Otherwise, the generation time may exceed an acceptable time frame for generation when generating messages that are larger in size. Additionally, the size of the message also diminishes the effective working size of a hash function being used. For example, if a message is twelve bits in length, then the strength of a SHA256 hash function is reduced to 244 bits. Larger messages would reduce the strength of hash function to the point of vulnerability.

The message decoder 130 is a component of the message embedding system 100 configured to decode messages embedded in messages, in accordance with embodiments of the present disclosure. The hashing mechanism 120 can apply a pre-shared hash function on a received random value to generate a hash value. The message decoder can analyze the hash value and verify that the bit sequence is set in the hash value generated by the hashing mechanism 120.

In some embodiments, the message decoder 130 verifies that the bit sequence in the hash value is consistent with a pre-shared secret between the sending party and the receiving party. For example, a sending party may have embedded a password used to authenticate the sending party. The message decoder 130 can verify that the password is consistent with the password stored by the receiving party. Upon verifying the bit sequence, the message decoder 130 can confirm that the message is received. Depending on the type of message transmitted and upon successful verification, the embedded message may be used to grant a sending party access to restricted areas or it may allow for different protocol features (e.g., post quantum cryptography).

The hash table 140 is a component of the message embedding system 100 configured to store hash values relating to the message embedding system 100, in accordance with embodiments of the present disclosure. While shown in FIG. 1 as a table, the hash table 140 can be a mapping, a database, journal, metadata, and the like. In some embodiments, the hash table 140 temporarily stores the hash values produced by the hashing mechanism 120. For example, when a hashing mechanism 120 is iteratively applying a hash function to a random value, the resulting hash values can be stored on the hash table 140. Once a hash value is generated, and a corresponding hash value is selected for transmission, then the hash table 140 can be permanently erased.

It is noted that FIG. 1 is intended to depict the representative major components of an exemplary message embedding system 100. In some embodiments, individual components may have greater or less complexity than as represented in FIG. 1, components other than or in addition to those shown in FIG. 1 may be present, and the number, type, and configuration of such components may vary.

Figure 2:
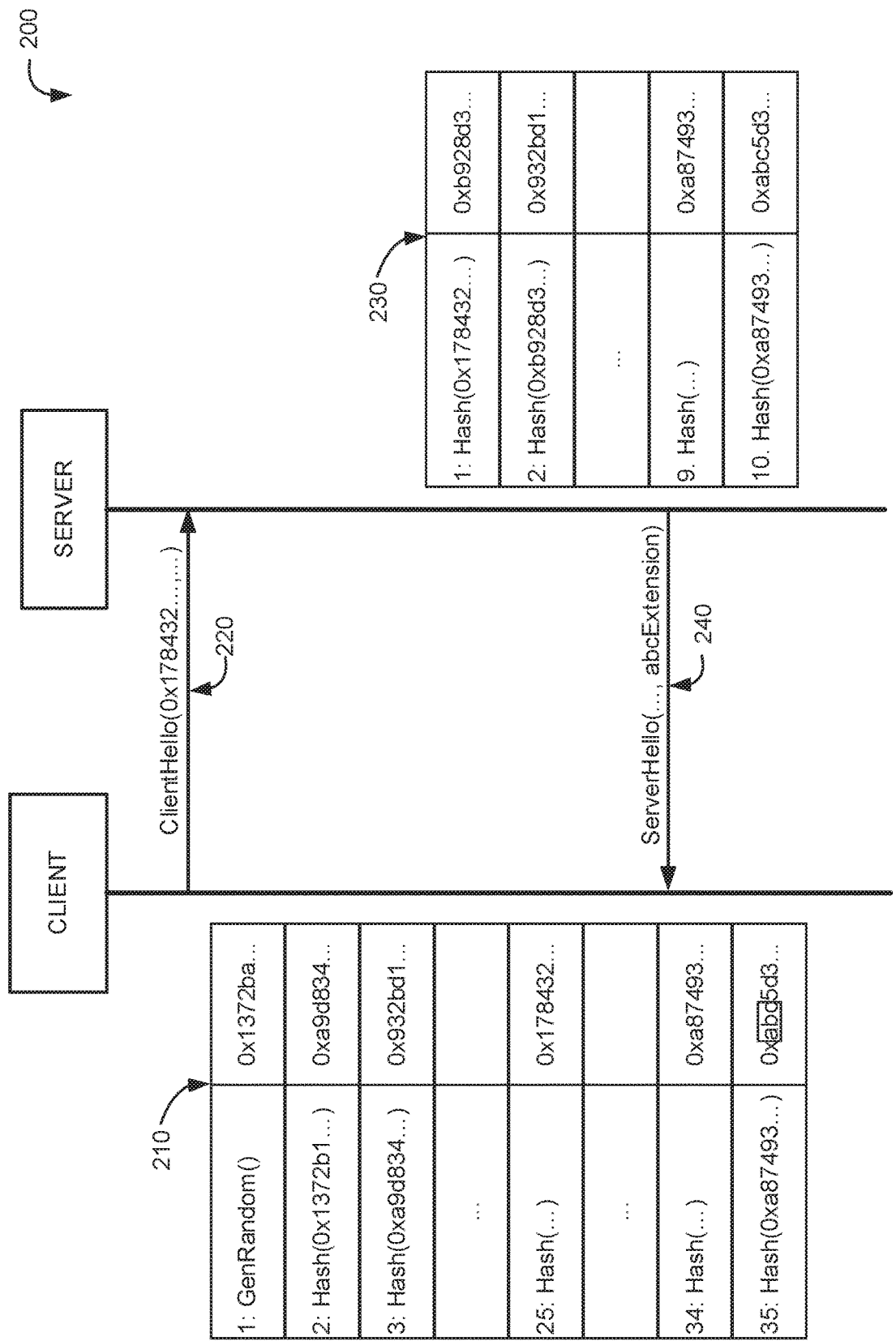
FIG. 2 is a data flow diagram illustrating an exemplary handshake initiation between a client and a server using a message embedding process according to the message embedding system, in accordance with embodiments of the present disclosure.

FIG. 2 is a data flow diagram 200 illustrating an exemplary handshake initiation between a client and a server using a message embedding process according to the message embedding system 100, in accordance with embodiments of the present disclosure. To illustrate data flow diagram 200, but not to limit embodiments, FIG. 2 is described within the context of the message embedding system 100 of FIG. 1.

At step 210, the client wishes to embed a message of "abc" in a random value and transmit that message to the server. The number generator 110 generates a random value of "0x137ba . . . ". Using the random value, the hashing mechanism 120 iteratively applies a hash function to the random value. After each iteration, the generated hash value is evaluated to determine if a bit sequence in the hash value is equivalent to the message the client wishes to transmit. Additionally, each hash value generated is temporarily placed in a table. At the thirty-fifth iteration, the hashing mechanism 120 generates a hash value of "0xabc5d3 . . . ." The hash value contains the required message embedded within the hash value.

At step 220, the client transmits the twenty-fifth hash value illustrated in the table as a random value in a client hello message to the server. A pre-shared number of ten is known between the client and the server. The predetermined number represents the number of times the random value requires hashing to reveal the embedded message. Additionally, as an additional parameter in the client hello message, the client can provide the server with the hash function required to hash the random value. For example, if the client used SHA256, then that information would be provided to the server so as to allow the server to use the correct hash function.

At step 230, the hashing mechanism 120, on the server side, applies the hash function to the random value received in the client hello message. The hash function is applied the same number of times as the pre-shared number. On the tenth iteration, the hashing mechanism 120 produces a hash value of "0xabc5d3 . . . " which is the same hash value produced by the client that contains the embedded message.

The message decoder 130 verifies what action to take based on the embedded message. In this instance, the embedded message is a request for a protocol extension provided by a cryptosystem and offered by the server. At step 240, the server transmits the abcExtension in a server hello message to the client. The abcExtension can be any extension that the client and server is capable of. For example, the abcExtension can be a post quantum cryptography extension that allows the server and client to encrypt messages using post quantum algorithms and techniques.

Figure 3:
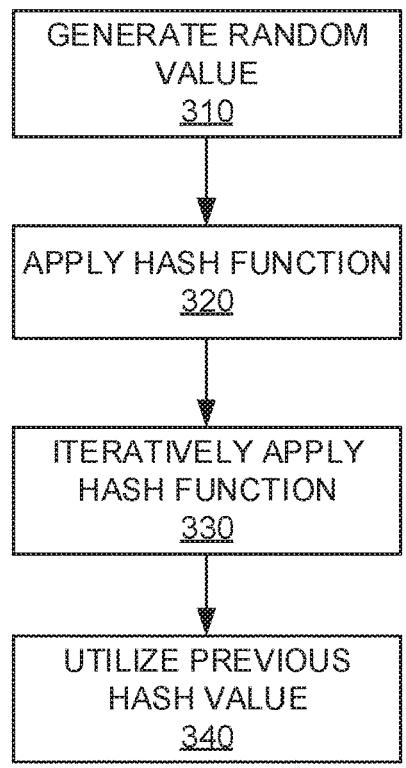
FIG. 3 is a flow diagram of a message embedding process, in accordance with embodiments of the present disclosure.

FIG. 3 is a flow diagram illustrating a process 300 for embedding a message in a random value, in accordance with embodiments of the present disclosure. The process 300 may be performed by hardware, firmware, software executing on at least one processor, or any combination thereof. For example, any or all of the steps of the process 300 may be performed by one or more computing devices (e.g., computer system 500 of FIG. 5). To illustrate process 300, but not to limit embodiments, FIG. 3 is described within the context of the message embedding system 100 of FIG. 1.

The process 300 begins with the number generator 110 generating a random value. This is illustrated at step 310. In some embodiments, the number generator 110 utilizes a CSPRNG to generate the random value. The CSPRNG can be a secure block cipher converted into a CSPRNG by running the cipher in a counter mode. The counter mode is performed by using the block cipher to encrypt a '1', and then a '2', and so on until a random value is produced using the result of the encryptions. In counter mode, the block cipher can be started at an arbitrary number other than one or zero. By utilizing a block cipher, the birthday paradox is avoided because a block cipher in counter mode does not output identical blocks. The type of block ciphers used by the number generator 110 include, but are not limited to, Feistel ciphers, substitution-permutation networks, Lai-Massey ciphers, and ARX.

In some embodiments, the number generator 110 uses a stream cipher to generate a random value. A stream cipher works by generating a pseudorandom stream of bits that are combined and XORed with plaintext. The stream cipher can operate on a counter that returns a new pseudorandom stream. The type of stream ciphers used by the number generator 110 include, but are not limited to, RC4, A5/1, ISAAC, Salsa20, VEST, and A5/2.

Once the random value is generated, the hashing mechanism 120 applies a hash function to the random value. This is illustrated at step 320. The generated hash value is examined to determine whether a bit sequence representing a message a sending party wishes to embed is located within the hash value. The generated hash value can also be placed into the hash table 140 to allow the message embedding system 100 to reference the hash value if needed. For example, if the sending party and the receiving party have a pre-shared number, the hash value that is transmitted may be any of the generated hash values depending on when the bit sequence is generated.

The hashing mechanism 120 iteratively applies the hash function as illustrated at step 320 until the bit sequences representing the message appears in a generated hash value. This is illustrated at step 330. The iterative process is the repetition of the hashing mechanism 120 applying a hash function to the previously generated hash value in order to generate a hash value that has a bit sequence representing a message a sending party wishes to embed. Each repetition of the process is a single iteration, and the outcome of each iteration is then the starting point of the next iteration (i.e., the generated hash value is used as input in the subsequent iteration).

In some embodiments, the hash value generated at each iteration is placed into the hash table 140. After each iteration, a hash value is generated and can be placed into the hash table 140. The hash values can be placed into the hash table 140 until a hash value with a bit sequence corresponding to a message is generated.

In some embodiments, an iteration count is incremented after each iteration. After each iteration, the iteration count is incremented until the hash value with a bit sequence corresponding a message is generated. The increment count can reflect the number of iterations that occurred to reach the final hash value with the embedded message.

A previous hash value is utilized as a new random value in a cryptosystem. This is illustrated at step 340. In some embodiments, a previous hash value is utilized as a new random value in a cryptosystem. The previous hash value can be the hash value that immediately preceded the final hash value that had the embedded message. In some embodiments, the hash value utilized is from an iteration that preceded the final hash value by a pre-shared and predetermined number. For example, a pre-shared number of ten can be known to a sending party and receiving party. The hash value that is used would be from an iteration that occurred ten iterations before the final iteration. The hash table 140 can be referenced and the hash value can be retrieved.

In some embodiments, the pre-shared and predetermined number is incremented after each use. The increments can be incremented by one or by some other agreed upon number such as five or twelve. For example, if the predetermined number is five, after the sending party transmits a hash value that occurred five iterations prior to the final hash value, five is incremented by the agreed upon number. If the agreed upon number is one, then the predetermined number is incremented to six, and so on.

In some embodiments, the hash value utilized is the random value generated by the number generator 110. The hash value generated by a predetermined iteration can be examined to determine whether a bit sequence is produced in the hash value. Upon determining, that the hash value does not have the bit sequence, then the random value can be utilized as the random value in the cryptosystem. This prevents inadvertent messages from appearing in random values when the sending party wishes to not send a message.

Figure 4:
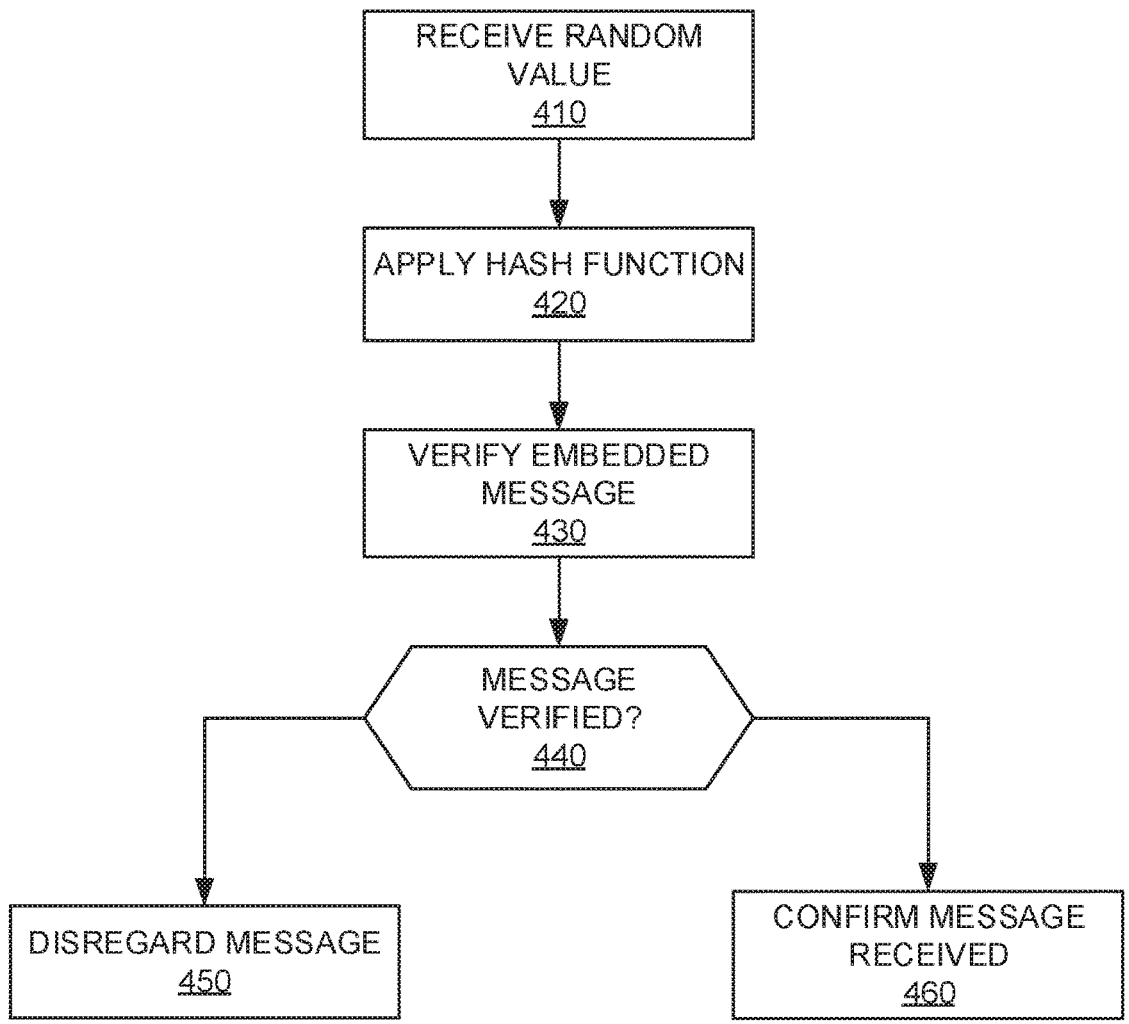
FIG. 4 is a flow diagram of a message decoding process, in accordance with embodiments of the present disclosure.

FIG. 4 is a flow diagram illustrating a process 400 for decoding a message in a random value, in accordance with embodiments of the present disclosure. The process 400 may be performed by hardware, firmware, software executing on at least one processor, or any combination thereof. For example, any or all of the steps of the process 400 may be performed by one or more computing devices (e.g., computer system 500 of FIG. 5). To illustrate process 400, but not to limit embodiments, FIG. 4 is described within the context of the message embedding system 100 of FIG. 1.

The process 400 begins with the message embedding system 100 receiving a random value. This is illustrated at step 410. The random value can be parameter in a transmission of a cryptosystem. For example, the random value can be a parameter in a transmission sent by a client establishing a TLS connection or secure socket layer (SSL) connection with a server. If the random value was included in a TLS client hello message, the random value is 32-bytes in length. However, the size of the random value can vary depending on the cryptosystem being utilized.

The hashing mechanism 120 applies a hash function to the random value. This is illustrated at step 420. The same hash function used to embed a message in the random value is the same hash function being used. The type of hash function used by a sending party can be included as a parameter, when sending the random value. The hashing mechanism 120 iteratively applies the hash function a predetermined amount of times. The amount of times the hashing mechanism 120 applies the hash function can be based on a predetermined number shared between the sending party and the receiving party. For example, if the predetermined number is one, then the hashing mechanism 120 applies the hash function to the random value once. In another instance, if the predetermined number is ten, then the hashing mechanism 120 iteratively applies the hash function to the random value and resulting hash values ten times. The final hash value contains the embedded message.

The message decoder 130 verifies that the final hash value contains the embedded message. This is illustrated at step 430. The message decoder 130 can verify the relationship between the sending party and the receiving party to determine the type of message being received. For example, the sending party and the receiving party may have an agreement on a pre-shared secret to be used as the message. The sending party can transmit the secret which can be used as an authentication factor by the receiving party to authenticate the sending party.

In some embodiments, the message decoder 130 verifies the message as a feature signal. To avoid man-in-the-middle interference (e.g., Internet Service Providers (ISP)s) from preventing protocol features, a sending party can transmit a signal message to a receiving party for a feature in a protocol that may be prohibited by an intervening party. For example, a protocol feature may be post quantum cryptography which the sending party wishes to enable. Upon receiving the embedded signal message, the receiving party can provide that feature to the sending party.

The message decoder 130 determines whether the message is verified. This is illustrated at step 440. For example, if the message is used as a type of authentication mechanic, then the message decoder 130 can verify whether the message corresponds with a pre-shared secret. If the message does not match exactly to the pre-shared secret, then the message is disregarded. This is illustrated at step 450. The sending party can then utilize the random value in the cryptosystem as if no embedded message was transmitted. However, if the message is verified, the sending party proceeds with confirming that the message is received. This is illustrated at step 460. The confirmation can depend on the type of message being sent. If the message corresponds to a protocol feature request, the sending party can implement that feature and proceed with the steps of the cryptosystem as if the request was made in a parameter. If the message corresponds to a pre-shared secret, then the server can authenticate the user and grant the user the benefits provided by the authentication.

Figure 5:
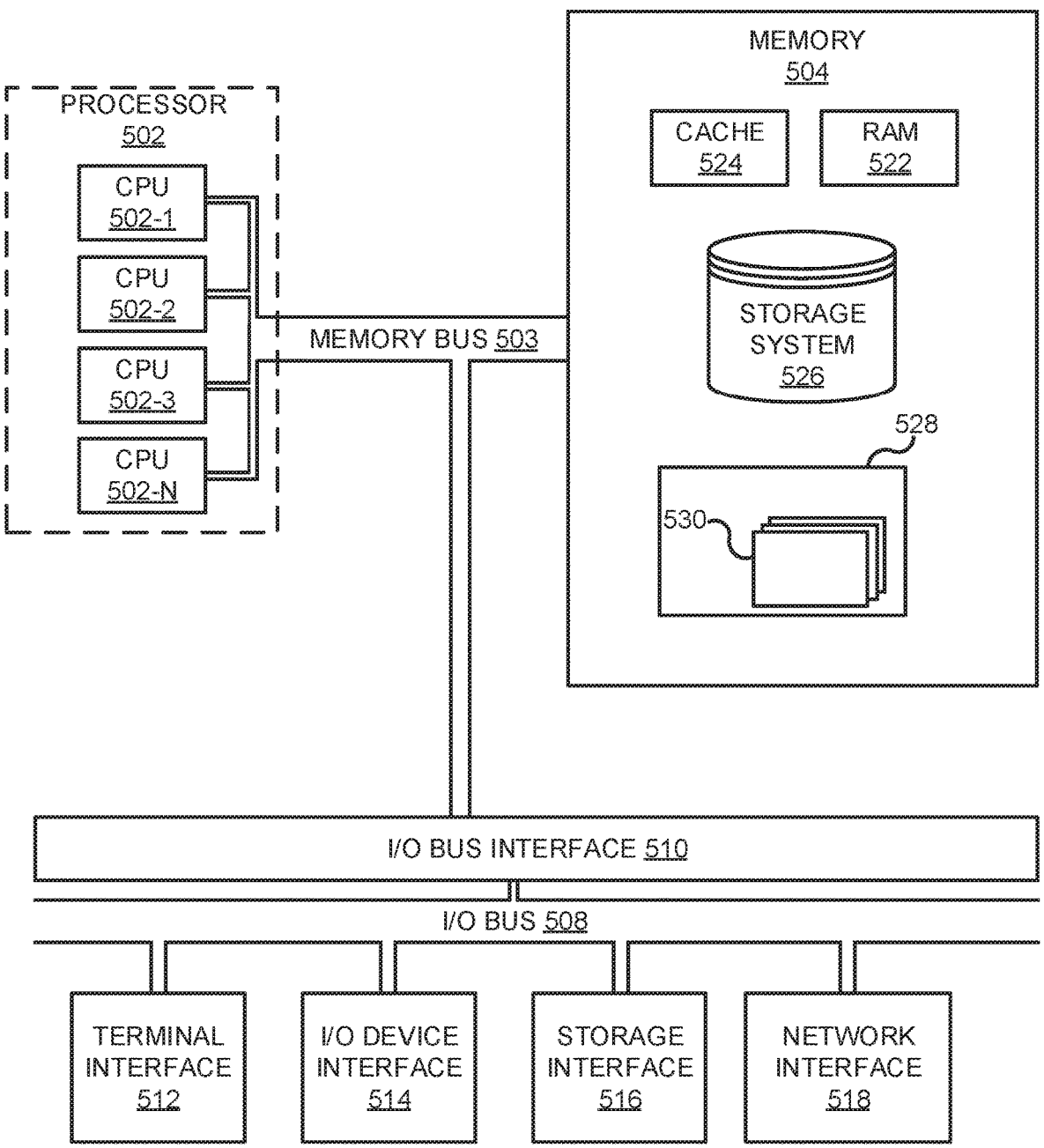
FIG. 5 is a high-level block diagram illustrating an example computer system that may be used in implementing one or more of the methods, tools, and modules, and any related functions, described herein, in accordance with embodiments of the present disclosure.

Referring now to FIG. 5, shown is a high-level block diagram of an example computer system 500 (e.g., the message embedding system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more processors 502, a memory 504, a terminal interface 512, a I/O (Input/Output) device interface 514, a storage interface 516, and a network interface 518, all of which may be communicatively coupled, directly or indirectly, for inter-component communication via a memory bus 503, a I/O bus 508, and an I/O bus interface 510.

The computer system 500 may contain one or more general-purpose programmable central processing units (CPUs) 502-1, 502-2, 502-3, and 502-N, herein generically referred to as the processor 502. In some embodiments, the computer system 500 may contain multiple processors typical of a relatively large system; however, in other embodiments, the computer system 500 may alternatively be a single CPU system. Each processor 501 may execute instructions stored in the memory 504 and may include one or more levels of on-board cache.

The memory 504 may include computer system readable media in the form of volatile memory, such as random-access memory (RAM) 522 or cache memory 524. Computer system 500 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 504 can include flash memory, e.g., a flash memory stick drive or a flash drive.

Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the processors 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units, multiple I/O buses, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the major representative components of an exemplary computer system 500. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
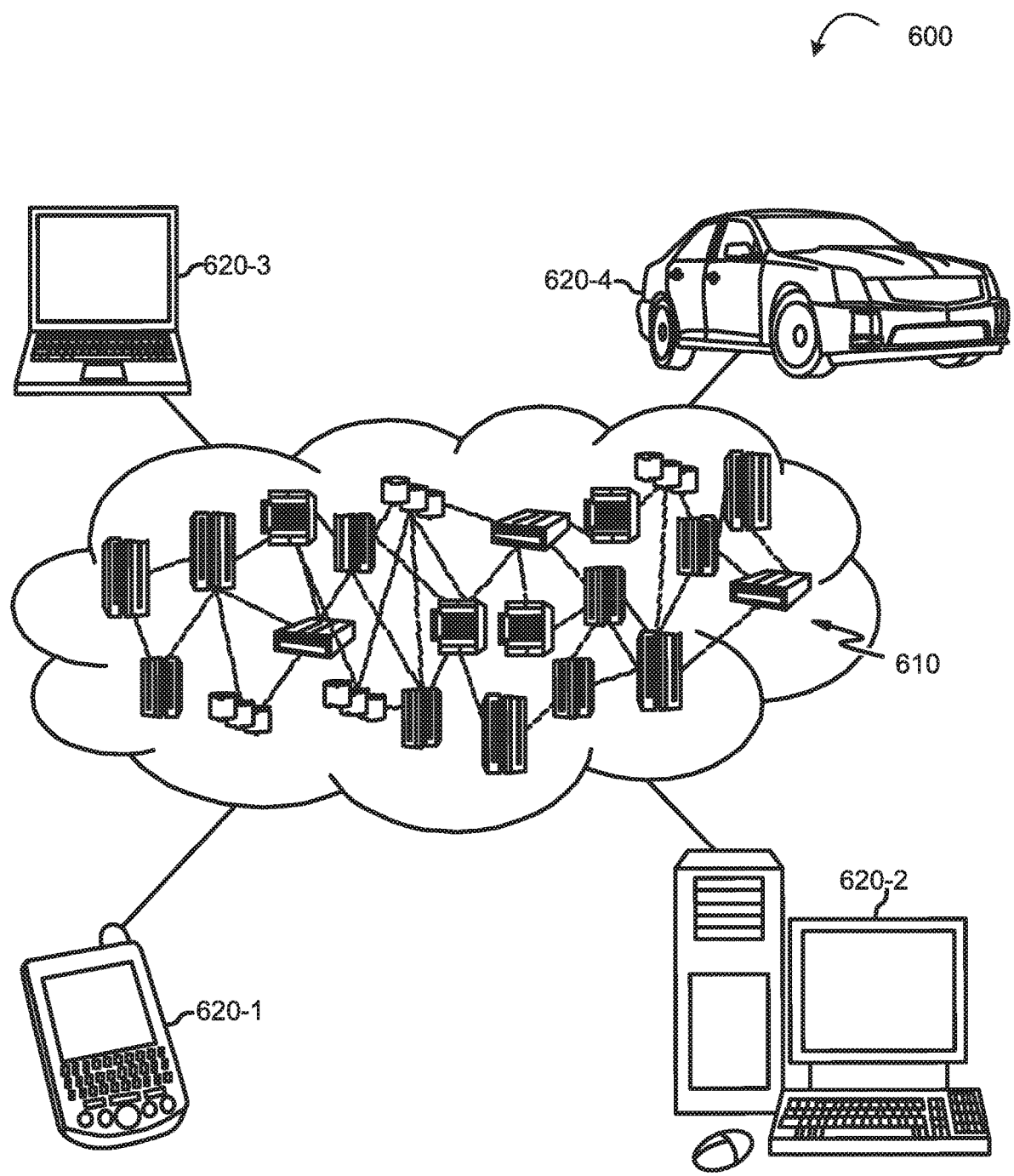
FIG. 6 depicts a cloud computing environment, in accordance with embodiments of the present disclosure.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 620-1, desktop computer 620-2, laptop computer 620-3, and/or automobile computer system 620-4 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620-1 to 620-4 shown in FIG. 6 are intended to be illustrative only and that computing nodes 610 and cloud computing environment 600 can communicate with any type of computerized device over any type of network and/or network addressable connection (e.g., using a web browser).

Figure 7:
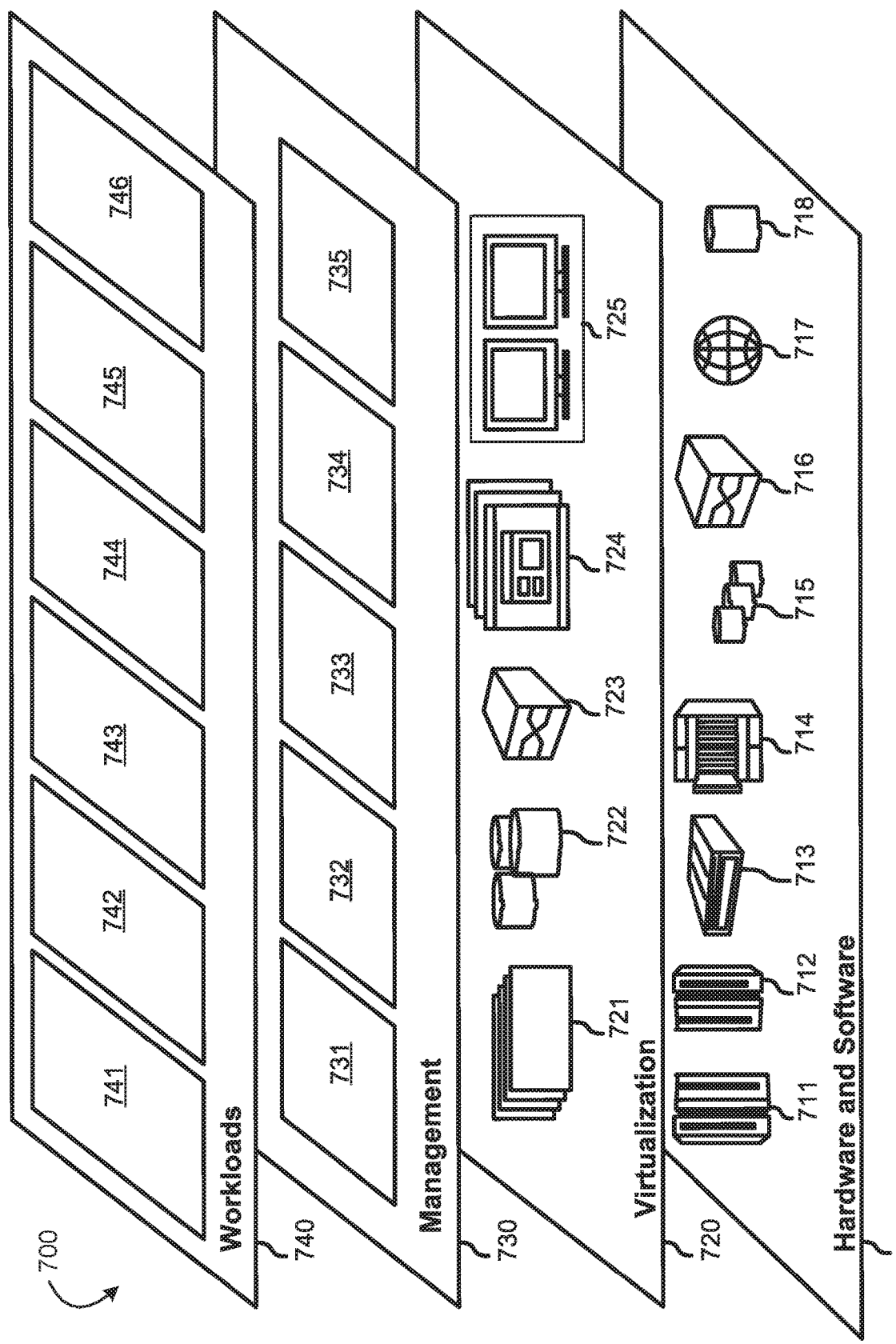
FIG. 7 depicts abstraction model layers, in accordance with embodiments of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 may provide the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (SLA) planning and fulfillment 735 provide pre-arrangement for, and procurement of, cloud computing resources for which a future requirement is anticipated in accordance with an SLA.

Workloads layer 740 provides examples of functionality for which the cloud computing environment may be utilized. Examples of workloads and functions which may be provided from this layer include mapping and navigation 741; software development and lifecycle management 742 (e.g., the message embedding system 100); virtual classroom education delivery 743; data analytics processing 744; transaction processing 745; and precision cohort analytics 746.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for embedding a message in a random value, the computer-implemented method comprising:
   generating a random value;
   applying a hash function to the random value producing a hash value;
   starting with the hash value, reapplying the hash function in an iterative or recursive manner, with a new hash value produced by the hash function acting as an initial value that is applied to the hash function for a next iteration, until a predetermined bit sequence representing a message is produced in a message hash value; and
   utilizing a previous hash value as a new random value in a cryptosystem, wherein the previous hash value is another hash value produced prior to the message hash value.

2. The computer-implemented method of claim 1, further comprising:
   examining the new hash value after a predetermined iteration to determine whether the bit sequence is located in the new hash value; and
   utilizing the random value as the new random value, upon determining that an inadvertent message is not embedded in the hash value.

3. The computer-implemented method of claim 1, further comprising:
   receiving a transmitted random value;
   applying the hash function on the transmitted random value producing a received hash value;
   verifying a received message is embedded in the received hash value; and
   confirming that the received message is received.

4. The computer-implemented method of claim 3, further comprising:
   starting with the received hash value, reapplying the hash function a predetermined amount of times prior to verifying the received message.

5. The computer-implemented method of claim 1, further comprising:
   determining an iteration count required to produce the message hash value, wherein the iteration count reflects a number of iterations that occurred to produce the message hash value;
   subtracting a predetermined number from the iteration count producing a second iteration count;
   retrieving a second hash value that resulted at the second iteration count from a hash table; and
   utilizing the second hash value as the new random value.

6. The computer-implemented method of claim 5, wherein the predetermined number is incremented after each use.

7. The computer-implemented method of claim 1, wherein the message hash value indicates an additional protocol feature capability.

8. The computer-implemented method of claim 1, wherein the message hash value is a pre-shared secret used as an authentication mechanism.

9. The computer-implemented method of claim 1, wherein the hash function is a hash-based message authentication code (HMAC).

10. A computer program product for embedding a message in a random value, the computer program product comprising:
   one or more computer readable storage media, and program instructions collectively stored on the one or more computer readable storage media, the program instructions comprising:
   program instructions to generate a random value;
   program instructions to apply a hash function to the random value producing a hash value;
   program instructions to start with the hash value, reapply the hash function in an iterative or recursive manner, with a new hash value produced by the hash function acting as an initial value that is applied to the hash function for a next iteration, until a predetermined bit sequence representing a message is produced in a message hash value; and
   program instructions to utilize a previous hash value as a new random value in a cryptosystem, wherein the previous hash value is another hash value produced prior to the message hash value.

11. The computer program product of claim 10, further comprising:
   program instructions to examine the new hash value after a predetermined iteration to determine whether the bit sequence is located in the new hash value; and
   program instructions to utilize the random value as the new random value, upon determining that an inadvertent message is not embedded in the hash value.

12. The computer program product of claim 10, further comprising:
   program instructions to receive a transmitted random value;
   program instructions to apply the hash function on the transmitted random value producing a received hash value;
   program instructions to verify a received message is embedded in the received hash value; and
   program instructions to confirm that the received message is received.

13. The computer program product of claim 12, further comprising:
   program instructions to start with the received hash value, reapply the hash function a predetermined amount of times prior to verifying the received message.

14. The computer program product of claim 10, further comprising:
   program instructions to determine an iteration count required to produce the message hash value, wherein the iteration count reflects a number of iterations that occurred to produce the message hash value;
   program instructions to subtract a predetermined number from the iteration count producing a second iteration count;
   program instructions to retrieve a second hash value that resulted at the second iteration count from a hash table; and
   utilizing the second hash value as the new random value.

15. The computer program product of claim 14, wherein the predetermined number is incremented after each use.

16. The computer program product of claim 10, wherein the message hash value indicates an additional protocol feature capability.

17. The computer program product of claim 10, wherein the message hash value is a pre-shared secret used as an authentication mechanism.

18. The computer program product of claim 10, wherein the hash function is a hash-based message authentication code (HMAC).

19. A system for embedding a message in a random value, the system comprising:
   a data processing component;
   a physical memory; and
   local data storage having stored thereon computer executable program code, which when executed by the data processing component, cause the data processing component to:
   generate a random value;
   apply a hash function to the random value producing a hash value;
   starting with the hash value, reapply the hash function in an iterative or recursive manner, with a new hash value produced by the hash function acting as an initial value that is applied to the hash function for a next iteration, each new hash value stored in a hash table and examined to determine whether it contains a predetermined bit sequence representing a message, the hash function reapplied until determining that the predetermined bit sequence is located in the new hash value, wherein the new hash value determined to contain the predetermined bit sequence is a message hash value;
   identify, from the hash table, a second hash value that resulted at a predetermined number of iterations before the message hash value was produced; and
   utilize the second hash value as a new random value in a cryptosystem.

20. The system of claim 19, further comprising:
   receive a transmitted random value;
   apply the hash function on the transmitted random value producing a received hash value;
   verify a received message is embedded in the received hash value; and
   confirm that the received message is received.

* * * * *